Feb. 28, 1933.  A. E. LARSEN  1,899,096
AIRCRAFT HAVING SUSTAINING ROTORS
Filed June 29, 1931  3 Sheets-Sheet 1

Feb. 28, 1933.   A. E. LARSEN   1,899,096
AIRCRAFT HAVING SUSTAINING ROTORS
Filed June 29, 1931   3 Sheets-Sheet 2

INVENTOR
Agnew E. Larsen
BY
ATTORNEYS

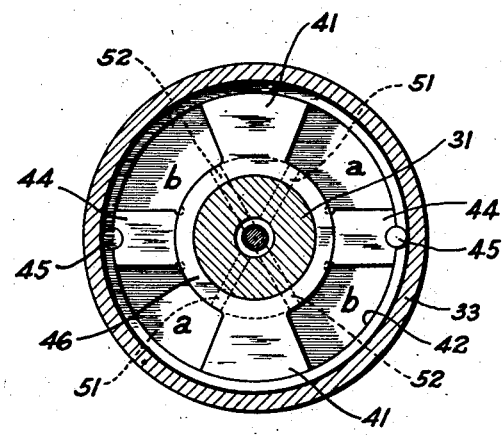
Fig: 6
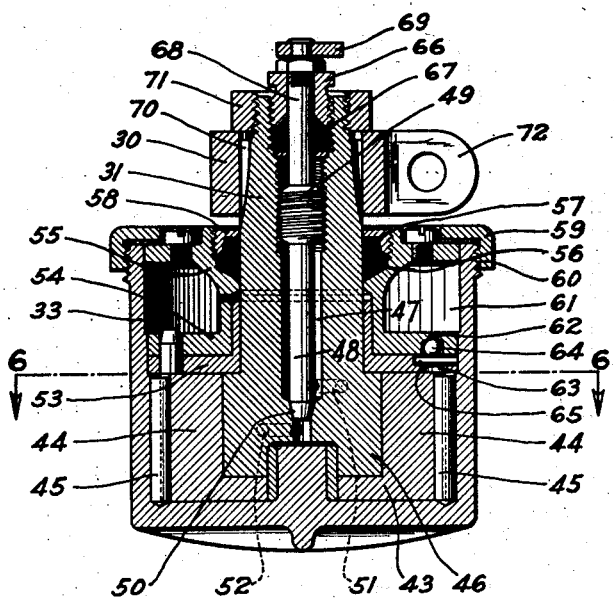
Fig: 5

UNITED STATES PATENT OFFICE

AGNEW E. LARSEN, OF HUNTINGDON VALLEY, PENNSYLVANIA, ASSIGNOR TO AUTO-GIRO COMPANY OF AMERICA, OF PHILADELPHIA, PENNSYLVANIA, A CORPORATION OF DELAWARE

AIRCRAFT HAVING SUSTAINING ROTORS

Application filed June 29, 1931. Serial No. 547,692.

This invention relates to aircraft having sustaining rotors and is especially concerned with the type of rotor construction in which a plurality of blades or wings are mounted for rotation about a common substantially vertically extended axis.

The nature, objects and advantages of the invention will be understood more clearly from a consideration of the following general discussion of various characteristics of sustaining rotors of the character here involved.

In order that the blades may be free, independently, to assume various different positions of equilibrium between different flight forces during rotation of the rotor system, each blade is preferably pivoted or articulated to a central hub or axis mechanism, the articulations, in the preferred embodiment, including, for each blade, a substantially horizontally disposed pivot pin and a substantially vertically disposed pivot pin.

In this way, the different, as well as varying, flight forces, such for example, as inertia, lift, drag and anti-drag are permitted to move or displace the individual blades both within as well as transversely of their general or mean path of travel, so that a condition of substantial equilibrium is obtained at all times. The blade movements, in a structure of this character, are quite great and also quite irregular under certain flight conditions, for example, during relatively fast forward translational movement of the craft.

While it is desirable that the blades should have substantial freedom to assume their independent or individual positions of equilibrium between flight forces, at the same time, it is found to be of advantage to somewhat restrict or at least control certain individual displacement movements.

In its broad aspects, the present invention has in view the provision of a novel and highly efficient mechanism for controlling certain rotor blade movements, it being an object of the invention to provide effective control by means of parts which are light in weight, simple in construction, readily adjustable and conveniently inspected or repaired.

Still further, this invention contemplates utilizing a hydraulically operative device for controlling blade movement, this device being arranged in such manner as not to produce a rebounding blade movement. This is of advantage since devices which tend to cause "rebounding" (such for example as resilient devices) have a tendency to set up or build up undesirable synchronized blade movements, this sometimes resulting in vibration or "weaving" of the rotor and its supporting structure, the vibrations being also transmitted into the body structure.

The use of the hydraulic blade movement dampening or controlling device of the present invention is additionally advantageous in providing for adjustment of the damping effect or reaction over a wide range. That is, the device is constructed and arranged in such manner that, by suitable adjustment, very light, relatively heavy or any desired intermediate damping reaction may be afforded. This feature results in adaptability of the device to sustaining rotors of widely varying characteristics and sizes.

The hydraulic damper of the present invention is also arranged in such manner that a given setting or adjustment may very readily be maintained, the parts not being subject to material wear and consequent undesirable variation in damping reaction. This is of considerable importance in saving time and expense involved in inspection and service work as well as in ensuring more uniform reaction.

More specifically, the present invention contemplates the use of a plurality of devices of the character referred to, each one of the blades being provided with one, preferably mounted adjacent to the main longitudinal blade spar and housed, in large part, within the blade covering. In addition and since the reaction may be adjusted over a relatively wide range, I further enhance the adaptability of the damping devices by constructing them in such manner that they may readily be associated with and secured to blade spars of different dimensions.

A still further object of the invention is involved in the use of a novel type of actuating arm for each of the several damping devices, these arms being interconnected as by means of flexible cables or wires in a manner which will appear more clearly hereinafter. It should be noted at this point, however, that during normal rotor operation, the several sustaining blades, under the influence of flight forces, cone upwardly somewhat from their points of attachment to the central hub. In prior devices for controlling blade movements, for example, as described and claimed in the copending application, Serial No. 416,356, filed December 26th, 1929, of Juan de la Cierva, assignor to the assignee of this application, operating arms have been employed which normally lie closely adjacent to the blades themselves. When the coning action above referred to takes place such prior operating arms, of course, became very considerably angled with respect to each other with the result that the reaction of the controlling devices was somewhat irregular or offset from the general plane in which the devices themselves were disposed. In order to overcome this difficulty, the present invention contemplates utilizing operating or actuating arms for the several damping devices, the said arms being jointed, preferably closely adjacent to the devices themselves, so that the arms are free to pivot upwardly away from the blades during upward coning thereof and thus provide a more direct damping reaction through the interconnecting cables.

The general nature of the invention, as well as objects and advantages in addition to those pointed out above, will be more apparent upon consideration of the following description making reference to the accompanying drawings, in which Figure 1 is a top plan view of an aircraft embodying the present invention, certain blades of the craft being broken away so that the size of the figure may be increased;

Figure 5 is a vertical sectional view through one of the damping devices itself;

Figure 6 is a horizontal sectional view of a damping device, the view being taken substantially as indicated by the section line 6—6 on Figure 5;

Figure 8:
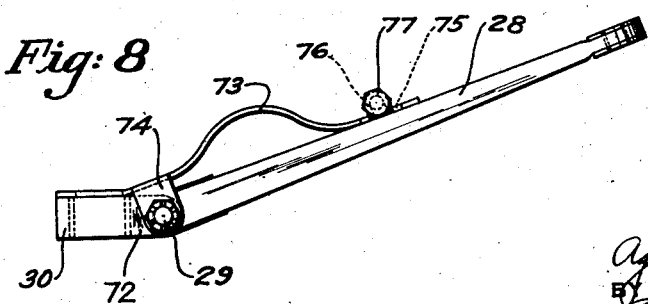

Figure 7 is an elevational view of a portion of a sustaining blade, looking toward the front or leading edge thereof, the blade in this view being coned upwardly substantially, as in flight operation, in order to illustrate the manner in which the operating or actuating arms or levers for the damping devices pivot to maintain reaction through the blade interconnecting cables substantially within a plane containing the dampers themselves; and Figure 8 is a side elevational view, on a considerably enlarged scale, of one of the damper actuating levers.

Figure 1:
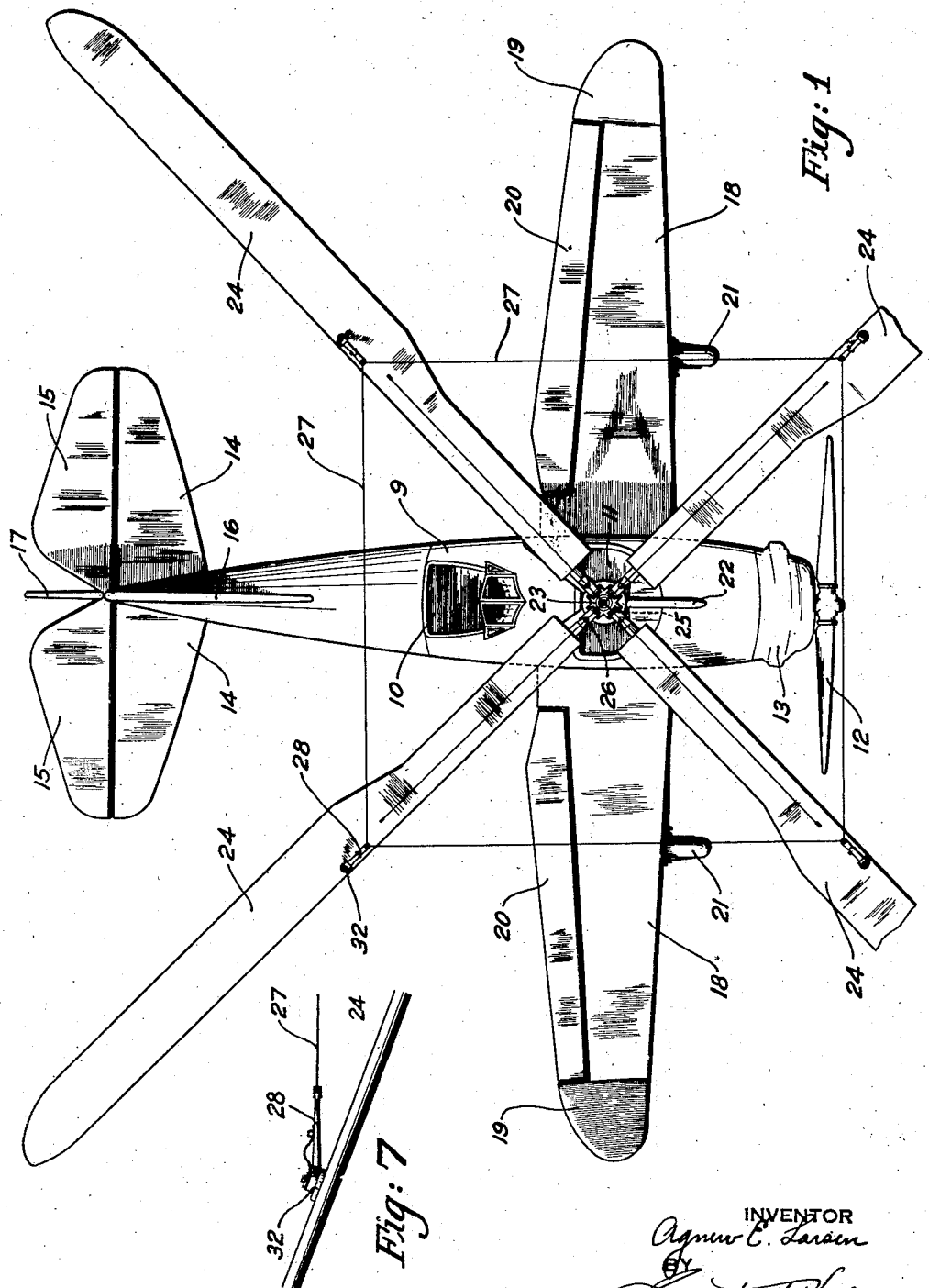
Figure 2:
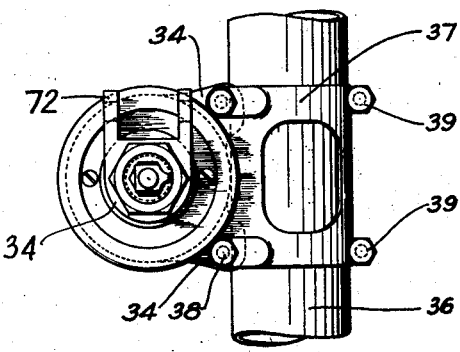
Figure 2 is a fragmentary top plan view of a blade spar to which a damping device constructed in accordance with the present invention has been applied.

In order that the nature of the invention may be fully comprehended, a brief description is presented herebelow of various elements and features of aircraft of the general type to which this invention relates. Such a craft is illustrated in Figure 1 as including a body or fuselage 9 in which any suitable passenger or occupant arrangements may be provided, in this instance, two cockpits 10 and 11 serving this purpose. At the forward end, the craft is provided with propelling means including the propeller 12 and an engine diagrammatically indicated at 13 while toward the rear end of the body, an empennage is arranged, this latter structure including substantially fixed and controllable horizontal surfaces 14—14 and 15—15, respectively. In addition, the empennage includes a fixed vertical stabilizer 16 and a rudder element 17.

If desired, fixed supplemental wings 18 may be extended laterally of the sides of the craft and provided with upturned tips 19 and these fixed wings 18 may serve to support aileron controls 20. Landing gear including wheels 21 is also provided.

The rotor system may conveniently be mounted above the body of the craft as by means of the pylon or pyramid structure composed of a plurality of post elements 22 which converge upwardly to a point above the cockpit 11 to support the central axis or hub mechanism indicated generally by the reference numeral 23. The supporting pylon structure illustrated in Figure 1 includes three leg or post elements 22. This particular type of structure, however, forms no part of the present invention per se, but is described and claimed in the copending application, Serial No. 497,745, filed November 24th, 1930, of Juan de la Cierva, assignor to the assignee of this application.

The rotor itself includes a plurality of sustaining blades 24 which are arranged radially about the central hub or axis 23. In order that the blades may be free independently to compensate for variations in flight forces they are individually pivoted to the central hub as by means of horizontally extended pivot pins 25 and vertical pivot pins 26.

The blade movement controlling mechanism, as here shown, includes cables or wires 27 which are extended to interconnect the blades of the set. The connection to each blade, however, is through a damping device which is illustrated more particularly in Figures 2 to 8 inclusive.

Turning now to the showing of Figures 1 to 4 and 8, it will be seen that the cables which are extended to each blade are directly connected to a pivoted arm 28. The arm 28 is jointed on a horizontal axis at 29 to an apertured fitting 30 which is adapted to engage an operating connection 31 (see Fig. 5) of the damping device indicated generally at 32. Making reference to Figures 2 to 5 inclusive, it will be seen that the damping device includes a casing 33 having opposed abutments or lugs 34 formed at one side thereof which are arranged to partially engage the blade spar 36. The damping device may be securely fastened to the spar as by means of a bent bracket 37 embracing the spar and secured as by bolts 38 to the opposed lugs 34—34. These assembled parts are arranged to rigidly clamp the spar by tightening the bolts 39 which are received in opposed and apertured lugs 40—40, the latter being formed in connection with the two halves of the split bracket 37.

Figure 3:
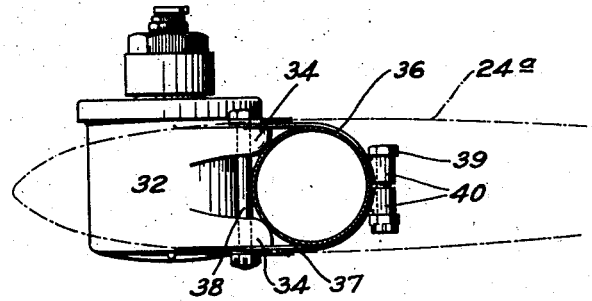
Figure 3 is a side view of the damping device shown in Figure 2, the view being taken endwise of a blade and illustrating the blade spar in vertical section.
Figure 4:
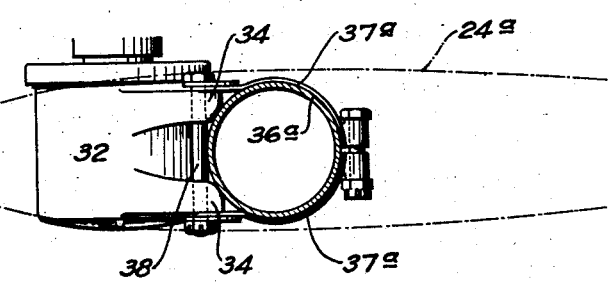
Figure 4 is a view similar to Figure 3 but illustrating the application of the damping device to a blade spar of somewhat larger diameter.

Before considering the details of the damping device itself, and as will be seen from comparison of Figures 3 and 4, the damping device is so arranged as to be readily adaptable to blade spars of different diameter. For example, in Figure 4, the blade spar 36a is somewhat larger in diameter than the one illustrated in Figure 3. With the larger spar a slightly modified securing bracket structure 37a is the only device which need be altered in order to apply the dampener.

Figures 3 and 4 serve to illustrate the manner in which the damping devices may be disposed, at least in large part, within the blade covering itself, this blade covering being diagrammatically indicated in these views at 24a.

In Figures 5 and 6 the internal structure of the damping device is illustrated in vertical and horizontal section. The central operating part 31 extends downwardly from its point of engagement with the operating lever 28 and its attaching member 30, within the casing 33. The member 31 has formed thereon a pair of oppositely arranged baffle parts 41 which fit snugly, at their outer ends, against the inner cylindrical surface 42 of the casing 33. A cooperating or complementary but fixed baffle part 43 having oppositely extended partition or wall members 44 is also mounted within the cylindrical cavity in the casing 33 and fixedly positioned therein as by means of pins 45, the pins being seated within cylindrical apertures formed partly within the casing itself and partly within the outer surface of the partition walls 44.

The manner in which these two cooperating baffle means fit together will be apparent from inspection of Figures 5 and 6. The interfit is such as to provide four chambers within the cylindrical casing 33, these chambers being arranged in diametrically opposed pairs $a$—$a$ and $b$—$b$.

The central or hub portion 46 of the member 31 is further provided with a central cavity 47 having a control valve 48, screw-threaded as at 49 for purposes of adjustment, and seating on a restriction 50 in the central cavity 47. Above the valve seat 50, the cavity 47 communicates with the opposed damper chambers $a$—$a$ through ducts or ports 51. Additional ports 52 extend radially inwardly from the opposed damper chambers $b$—$b$, to the central valve cavity at a point below the seat 50.

It will be seen, therefore, that upon rotation of the movable baffle parts 31, 46 and 41—41, in one direction or the other from the position illustrated in Figure 6, the fluid contained in the chamber $a$—$a$ and $b$—$b$ will be at least partially transferred from one pair to the other. The fluid may take any suitable form although oil is preferable, and the flow between the oppositely disposed pairs of chambers may be controlled in a convenient manner by adjustment of the central valve 48, so that relatively restricted or relatively free passage of the damping medium may be provided for, it being noted that the necessary flow involves, for example, passage of the oil inwardly through the ports 51—51 from the chambers $a$—$a$ into the valve cavity 47, passage of the oil through the valve itself to the ports 52—52, and thus outwardly into the other opposed cavities $b$—$b$.

The cooperating baffle parts are maintained in their operating positions as by means of a centrally flanged ring 53, the flange of this part being arranged to engage or receive the central operating member 31. An additional ring 54 may be superimposed upon the ring 53 and provided with an upward extension 55 serving to form a packing chamber 56 to receive any suitable type of packing 57 which may be tightened in place by the threaded ring 58. The members 53 and 54 may be maintained in proper positions within the casing 33 as by means of a cap part 59 which is threaded onto the casing 33 as indicated at 60.

It will be observed from inspection of Figure 3 that the foregoing arrangement of parts provides an annular cavity 61 above the parts 53 and 54. This annular cavity may conveniently be employed as a reservoir or source of supply of damping fluid. The fluid may pass from the reservoir downwardly into the chambers $a$ and $b$ through a port 62 in the collar 54 and an additional port 63 in the collar 53. From the latter port the fluid may pass downwardly into any one of the four damping chambers to maintain such chambers completely filled at all times. In order to prevent reverse flow of the damping fluid during actuation of the device, a check or ball valve 64 is employed, this being arranged to close automatically under the influence of pressure increase at the lower side thereof. A pin 65 serves to retain the ball valve in place.

At its upper end the operating part 31 is internally threaded to receive a gland 66 which is associated with packing 67 arranged around the valve operating stem 68. A member 69 may be arranged at the upper end of the valve operating stem in order to serve as a means by which the adjustments may be effected.

The upper end of the operating member 31 is further externally squared or fluted as indicated at 70 to engage the complementarily formed inner surface of the bracket member 30. Relative rotation of the parts 30 and 31 is thus prevented, and the part 30 may be rigidly secured in its proper position as by means of a threaded collar 71.

Turning now to Figures 7 and 8, in addition to Figure 5, it will be seen that the bracket 30 carries apertured lugs 72 which cooperate with the pivot 29 by means of which the lever 28 is attached to the dampener. A flat or leaf spring 73 is also associated with the lever 28 in such manner as to tend to retain the levers at a somewhat upwardly inclined angle, for example, as illustrated in Figure 8, this being the position at which the levers normally operate in flight operation when the sustaining blades are coned upwardly as illustrated in Figure 7. The spring 73 is attached at one end to the bracket 30 as by means of a clip 74 and at its other end the spring is provided with an elongated slot 75 through which a loop 76 extends, the latter being attached to the arm 28 itself. A bolt 77 is extended through the loop 76 and operates as a roller to ensure smooth action of the spring, in addition to preventing disengagement of the spring from the loop. It is noted that certain features of a pivoted operating member of the type above described are not a part of the present invention per se, but are described and claimed in the copending application, Serial No. 591,095, filed February 5th, 1932, of Juan de la Cierva.

In considering the operation of the blade movement controlling mechanism herein disclosed, reference should first be made to Figure 7 in which is illustrated, fragmentarily, a blade at an upwardly angled or coned position similar to that which is assumed during normal flight operation. Here it will be seen that the pivoted arm 28 is extended from the blade at an angle such that the reaction of the devices through the flexible cables 27 is effective substantially within the general plane in which the various operating levers for the several blades extend in flight operation. The reaction of the several dampeners, therefore, is substantially direct from blade to blade, this reaction being in the general plane in which the several damping devices themselves are located.

When one blade moves with respect to another, therefore, a force is set up tending to rotate the central baffle part of at least one of the damping devices. This rotary movement is, of course, restricted or yieldingly restrained by virtue of the more or less restricted flow between the several damping chambers of the devices.

Since the particular type of damping device disclosed, is capable of adjustment over a wide range of reaction, the devices are suitable for application to rotors of widely different operating or other characteristics.

In addition, the type of device here employed is especially advantageous as the presence of the damping fluid (oil), as well as the construction of the parts themselves, affords great life as against wear and, at the same time, permits maintaining uniform damper reaction at any given adjustment.

The structure of this invention is further highly desirable since a single damping unit may be applied to blade constructions of various different sizes and arrangements, substantially without altering any of the parts. The number of different types of damping devices which must be maintained in stock, therefore, is reduced to a minimum.

According to the foregoing, I have provided an efficient, readily adjustable and widely adaptable damping device for pivotally mounted aircraft sustaining blades, the arrangement of all the various parts being such that effective damping action is afforded and, at the same time, the aerodynamic efficiency of the rotor as a whole is enhanced, it being pointed out again that the individual damping devices may conveniently be mounted, at least in large part, within the blade covering itself.

What I claim is:—

1. In a construction of the character described, an axis structure, a sustaining bladed rotor mounted for rotation about the axis structure, a pivot joint providing for blade movement substantially within the general path of rotative travel thereof, and a hydraulic device for controlling pivotal blade movements.

2. In a construction of the character described, a rotatably mounted and jointed blade, and a hydraulic device for controlling blade joint movements, said device being mounted on the blade a substantial distance from the center of rotation.

3. An aircraft having sustaining blades mounted for rotary movement about a common upwardly directed axis and for pivotal movement in addition to the rotary movement, and a hydraulic device for controlling said pivotal movement arranged to react between a plurality of blades.

4. An aircraft having sustaining blades mounted for rotary movement about a common upwardly-directed axis and for pivotal movement in addition to the rotary movement, and a plurality of hydraulic devices for controlling said pivotal movement mounted in association with the blades and each arranged to react between a plurality of blades.

5. An aircraft having a sustaining rotor including a plurality of blades mounted for rotary movement about an upwardly extended axis and for pivotal movement in addition to the rotary movement, a hydraulic blade movement damping device mounted in association with each blade, and connections between the several damping devices.

6. An aircraft having a sustaining rotor including a plurality of blades mounted for rotary movement about an upwardly extended axis and for pivotal movement in addition to the rotary movement, a hydraulic blade movement damping device mounted in association with each blade, and connections between the several damping devices, said devices being disposed radially outwardly along the blades beyond the pivotal mounting therefor.

7. In combination with a rotatably and swingingly mounted aircraft sustaining blade, a device for controlling blade swinging movements, said device including mounting means constructed to embrace or engage blade supporting structures of different sizes for purposes of attachment thereto, together with a strap associated with said device for maintaining its mounting means in engagement with a blade supporting structure.

8. In combination with a rotatably and swingingly mounted aircraft sustaining blade, a device for controlling blade swinging movements, said device including mounting means having opposed abutments arranged to cooperate with blade structural parts of different sizes for purposes of attachment thereto.

9. In combination with a rotatably and swingingly mounted aircraft sustaining blade, a hydraulic device for controlling blade swinging movements, said device including a casing adapted to house the hydraulic operating fluid and cooperating baffle parts, and said casing having opposed abutment means thereon constructed to cooperate with blade spars of different sizes for purposes of attachment thereto.

10. An aircraft having sustaining blades mounted for rotary movement about a common upwardly directed axis and for pivotal movement in addition to the rotary movement, and a fluid-resistive device for controlling said pivotal movement, together with a fluid supply reservoir.

11. An aircraft having sustaining blades mounted for rotary movement about a common upwardly directed axis and for pivotal movement in addition to the rotary movement, and a fluid-resistive device for controlling said pivotal movement, together with a fluid supply reservoir and one way valve means between the supply reservoir and an operating chamber.

12. In combination with an aircraft sustaining blade mounted for rotation, for upward and downward swinging movements and for movements substantially within the general path of rotative travel, a device for controlling the last mentioned blade movements, said device being mounted on the blade and having an operating member pivotally connected therewith, together with a double-acting spring associated with said member and arranged to yieldingly maintain the member angularly disposed with respect to the blade.

13. In combination with an aircraft sustaining blade mounted for rotation, for upward and downward swinging movements and for movements substantially within the general path of rotative travel, a device for controlling the last mentioned blade movements, said device being mounted on the blade and having an operating member pivotally connected therewith, together with spring means associated with said member to yieldingly resist pivotal movement thereof, and roller means associated with the spring means to provide for free action thereof during pivotal movement of the member.

14. In a construction of the character described, an axis structure, a sustaining bladed rotor mounted for rotation about the axis structure, a pivot joint for a blade having an axis extended generally transverse to the blade axis and providing for swinging movements of the blade in addition to the rotative movement, and a hydraulic device for controlling pivotal blade movements about the said generally transverse axis.

15. An aerodynamically actuated rotor construction including an axis structure mounted for normally free rotation, aerofoil blade means mounted thereon in position to be rotated by relative air flow, a flexible mounting device for securing the blade means to the axis structure and providing for some degree of swinging oscillation of the blade means under variations in aerodynamic forces, and a fluid resistive device for controlling the blade oscillations as set up by variable aerodynamic forces.

In testimony whereof I have hereunto signed my name.

AGNEW E. LARSEN.